(12) United States Patent
Gonikberg

(10) Patent No.: US 6,618,451 B1
(45) Date of Patent: Sep. 9, 2003

(54) EFFICIENT REDUCED STATE MAXIMUM LIKELIHOOD SEQUENCE ESTIMATOR

(76) Inventor: Mark Gonikberg, 174 Chetwood Dr., Mountain View, CA (US) 94043

( * ) Notice: Subject to any disclaimer, the term of this patent is extended or adjusted under 35 U.S.C. 154(b) by 0 days.

(21) Appl. No.: 09/249,990

(22) Filed: Feb. 13, 1999

(51) Int. Cl.[7] .............................. H03D 1/00; H04L 27/06

(52) U.S. Cl. ...................................... 375/341; 375/229

(58) Field of Search ................................. 375/341, 262, 375/265, 229, 234, 348; 714/792, 795; 708/323; 369/59.16

(56) References Cited

U.S. PATENT DOCUMENTS

| | | | |
|---|---|---|---|
| 5,031,195 A | * 7/1991 | Chevillat et al. | 375/234 |
| 5,331,666 A | 7/1994 | Dent | 375/94 |
| 5,408,503 A | 4/1995 | Kahlman | 375/340 |
| 5,588,028 A | 12/1996 | Parizhsky | 375/341 |
| 5,684,811 A | 11/1997 | Doran | 371/43 |
| 5,784,415 A | 7/1998 | Chevillat et al. | 375/341 |
| 5,859,861 A | 1/1999 | Oh | 371/43.7 |
| 5,905,742 A | * 5/1999 | Chennakeshu et al. | 375/222 |
| 6,198,711 B1 | * 3/2001 | Fujita et al. | 369/59.16 |

FOREIGN PATENT DOCUMENTS

WO 98/29995 7/1998

OTHER PUBLICATIONS

K. J. Knudson et al., "Dynamc Threshold Implementation of the Maximum–Likelihood Detector for the EPR4 Channel," Proceedings of the *IEEE Telecommunications Conference Global'91*, Phoenix, AZ, Dec. 2, 1991, (Globecom), IEEE, vol. 3, pp. 2135–2139, XP000313770, ISBN: 0–87942–697–7.

W–T. Lee et al, "A Single–Chip Viterbi Decoder for a Binary Convolutional Code Using an Adaptive Algorithm," *IEEE Transactions on Consumer Electronics*, N.Y., vol. 41, No. 1, Feb. 1, 1995, pp. 150–159, XP000529220, ISSN: 0098–3063.

M. Nasiri–Kenari and C. K. Rushforth, "A Reduced–Complexity Sequence Detector with Soft Outputs for Partial–Response Channels," Proceedings of the *IEEE Global Telecommunications Conference* (Globecom), N.Y., Nov. 29, 1993, pp. 1955–1959, XP000436148.

(List continued on next page.)

*Primary Examiner*—Phuong Phu
(74) *Attorney, Agent, or Firm*—Zagorin, O'Brien & Graham LLP

(57) ABSTRACT

A reduced state maximum likelihood sequence estimator allows the use of improved equalization techniques that provides greatly improved performance for channels with severe attenuation and spectral nulls. The reduced state maximum likelihood sequence estimator retains $k_n$ states of a total number of K states, $k_n < K$, with each retained state having an associated state metric. $(J)(k_n)$ new states are determined based on $k_n$ previous states and a most recently received sample, using J transitions, J being a less than L, where L is a size of a symbol alphabet. $(J)(k_n)$ new state metrics are determined which are respectively associated with each new state. The new state metrics are compared to a threshold and those states whose metric does not exceed the threshold are retained. The reduced complexity of the MLSE allows for the use of partial response equalizers, e.g., a partial response class V (PRV) equalizer. The number of retained states $k_n$ varies according to an adaptive threshold which limits the number of retained states between a lower bound and an upper bound. The threshold may be determined according to the metric of the most likely state of the retained states and a selected one of a plurality of transition metrics associated with the most likely state metric.

40 Claims, 3 Drawing Sheets

OTHER PUBLICATIONS

Foschini, Gerald J., "A Reduced State Variant of Maximum Likelihood Sequence Detection Attaining Optimum Performance for High Signal–to–Noise Ratios", IEEE Transactions on Information Theory, vol. IT–23, No. 5, Sep. 1977, pp. 605–609.

Ungerboeck, Gottfried, "Channel Coding with Multilevel/Phase Signals", IEEE Transactions on Information Theory, vol. IT–28, No. 1, Jan. 1982, pp. 55–63.

Vermeulen, Franklin L. and Hellman, Martin E., "Reduced State Viterbi Decoders for Channels with Intersymbol Interference", Proceedings of the International Conference on Communications, Minneapolis, MN, Jun. 1974, pp. 37B–1 thru 37B–4.

Gitlin, Richard D. et al., "Data Communications Principles", Plenum Press, New York, 1992, pp. 233–517.

Bergmans, Jan W.M., "Digital Baseband Transmission and Recording", Kluwer Academic Publishers, Netherlands, 1996, pp. 264–373.

Vermeulen, Franklin Louis, "Low Complexity Decoders for Channels with Intersymbol Interference, A Dissertation Submitted to the Department of Electrical Engineering and the Committee on Graduate Studies of Stanford University . . . ", Aug. 1975, pp. 1–120.

International Telecommuniation Union, "Series V: Data Communication Over the Telephone Network", V.90, Sep. 1998, pp. 1–50.

* cited by examiner $$S_1 \{0,0\} \quad \begin{bmatrix} d_1 \\ d_2 \\ d_3 \\ d_4 \end{bmatrix} \quad \begin{matrix} A \in (0,1) \\ L = 2 \end{matrix}$$
$$S_2 \{0,1\}$$
$$S_3 \{1,0\}$$
$$S_4 \{1,1\}$$
$$S \qquad D$$

EFFICIENT REDUCED STATE MAXIMUM LIKELIHOOD SEQUENCE ESTIMATOR

BACKGROUND OF THE INVENTION

1. Field of the Invention

This invention relates to data communications and in particular to an efficient reduced state maximum likelihood sequence estimator for use in data communication systems.

2. Description of the Related Art

The received signal in a digital communication system includes noise and distortion caused at least in part by intersysmbol interference (ISI). One such digital communication system employs modems, which use digital modulation techniques to modulate and demodulate binary data over analog band-limited communications channels, e.g., telephone lines.

Modems typically conform to international standards to ensure interoperability with modems from other manufacturers. One such standard is the V.34 specification described in ITU-T Recommendation V.34, A Modem Operating at Data Signalling Rates of up to 28 800 bits/s for Use on the General Switched Telephone Network and on Leased Point-to-Point 2-Wire Telephone-Type Circuits, dated September, 1994 (previously CCITT Recommendation V.34), which is hereby incorporated herein, in its entirety, by reference. Another such standard is the V.90 specification described in ITU-T Recommendation V.90, A Digital Modem and Analogue Modem Pair For Use on the Public Switched Telephone Network (PSTN) At Data Signalling Rates of Up To 56 000 bits/s Downstream and Up To 33 600 bits/s Upstream, dated September, 1998, which is hereby incorporated herein, in its entirety, by reference.

Maximum Likelihood Sequence Estimators (MLSE) are widely used in data communications such as modem communications for decoding data passed through the channels with intersymbol interference (ISI) and for decoding convolutionally encoded data. The Viterbi algorithm (VA) is quite often used to implement MLSE. A brief description of the Viterbi algorithm, which is well known in the art, is provided to facilitate an understanding of the present invention.

Assume that a sequence of symbols $x=\{x_i\}$, $i \in ]-\infty;[$, $x_i \in A=\{a_1, a_2, \ldots a_L\}$ is transmitted through a channel with impulse response $h=\{h_i\}$, such that $h_i \neq 0$ only when $0 < h_i <= M$, where $M-1$ is the number of history terms contained in the channel. The signal received at the other end of the channel in the absence of noise is defined as $y=x*h$, where "*" denotes a convolution. If the noise $\eta$ is added to the signal in the channel, then the signal at the other end of the channel contains that noise and is defined as $z=y+\eta$. The receiver must reconstruct the transmitted sequence of symbols x, based on the received sequence z. At the time nT the following can be used to reconstruct the most recently sent symbol $x_n$:

$$x_n = (y_n - (x_{n-1}h_1 + \ldots + x_{n-M+1} h_{M-1}))/h_o \quad (1)$$

From the equation (1) it can be seen that besides the received signal $y_n$, value $x_n$ depends on the vector $\{x_{n-1}, \ldots x_{n-M+1}\}$ of $M-1$ previously decoded symbols. That vector will be further referred to herein as a state. With each new decoded symbol, the state of the decoder changes to reflect the new value of the vector $\{x_{n-1}, \ldots x_{n-M+1}\}$. That is, if at a time nT the state was $\{x_{n-1}, \ldots x_{n-M+1}\}$ then at a time $(n+1)T$ the new state will be $\{x_n, \ldots x_{n-M+2}\}$ and so forth. That change will be further referred herein as a state transition. The history of state transitions represents a state trajectory. Since each symbol $x_n$ belongs to a finite alphabet A of size L, there can only be $K=L^{M-1}$ unique states. All states comprise a state set $S=\{s_1, s_2, \ldots s_K\}$, where each element $S_k$ is a vector of $M-1$ elements that belong to alphabet A such that $s_k \neq s_m$ for $k \neq m$.

Since the noiseless channel output $y_n$ is not available to the receiver, the value of $x_n$ cannot be determined with absolute certainty, and instead an estimate is used:

$$x_n = (z_n - (x_{n-1}h_1 + \ldots + x_{n-M+1} h_{M-1}))/h_o \quad (2)$$

The Euclidean distance, $t_{n1}$, from the alphabet element $a_1$ to the estimate $x_n$, is defined as $t_{n1}=(x_n-a_1)^2$, which provides the measure of likelihood that the transmitted symbol $x_n$ equals $a_1$ at the time nT.

In a simple receiver, the alphabet element with the minimum Euclidean distance is selected and $x_n$ is assumed to be equal to that alphabet element. However if $x_n$ is not determined correctly (e.g. due to noise), that incorrect value will cause incorrect state transition causing future symbols to be decoded incorrectly affecting in turn future state transitions and so on. That condition is called "error propagation."

To avoid the "error propagation" problem, all possible decoder states and all possible state transitions must be examined. A state metric $D_n=\{d_{n1}, d_{n2}, \ldots, d_{nK}\}$ defines the measure of likelihood, such that each element $d_{nk}$ defines the measure of likelihood of state $s_k$ at a time nT which is directly related to the Euclidean distance of the elements of the symbol vector corresponding to state $s_k$. The relationship of the state metric D and state set S is shown in FIG. 1 in which set S is shown to consist of four states $s_1$ through $s_4$. In the example shown in FIG. 1 $A \in (0,1)$ and $L=2$ and $M=3$. Each state $s_1$ through $s_4$ has an associated state metric d1 through $d_4$ in D.

1. For each state $s_k$ of a set S calculate a symbol estimate $x_{nk}$, based on received symbol $z_n$ according to equation (2) above.
2. For each state $s_k$ of a set S consider L transitions from that state, and for each transition combination (k, 1) calculate a combined metric $d_{k1}=d_k+t_{k1}$, where $t_{k1}$ is an Euclidean distance of the alphabet element a1 from the symbol estimate $x_{nk}$, $t_{k1}=(x_{nk}-a_1)^2$.
3. For each state $s_k$ of a set S consider L transitions to that state, selecting the one with the minimum combined metric d calculated during step 2 and assign its value to the state metric $d_k$.
4. Find the state with the minimum metric $d_k$ storing a transition that led to that state as a candidate optimal trajectory.
5. The first four steps are repeated for each value of n, i.e., for each received symbol.

The optimal trajectory for the state with the smallest metric is considered the optimal path (most likely sequence) at a given time. As it can be seen from the above description, the computational complexity of the Viterbi algorithm is proportional to $L^M$. For high speed communication systems over band limited channels the value of L is large, thus making the Viterbi algorithm complexity potentially prohibitive even for channels with relatively short impulse response.

One use of the Viterbi algorithm, as stated above, is in modem data transmission. Such transmission is always affected by linear intersymbol interference (ISI) and by noise. These two impairments are typically countered by equalization, a technique which minimizes ISI and noise at periodic instances at which decisions are taken. The ultimate goal of the equalizer is to minimize a combined effect of ISI and noise and thus reduce the probability of incorrect decisions. Traditionally, dial up modem designers used Linear Equalizers (LE) to do the job. The performance of LE is quite satisfactory when the combination of the channel impulse response and the equalizer can form a Nyquist-1 pulse to satisfy the distortionless (zero ISI) criterion. To achieve that goal, the bandwidth of the channel has to be wider than the symbol rate employed by the modem.

The new generation of modems conforming to the V.90 recommendation no longer satisfy this criterion. The impulse response of a PCM codec is designed to achieve satisfactory transmission of voice signals, and its bandwidth is always more narrow than the 8000 Hz symbol rate used by a modem conforming to the V.90 standard. The spectral nulls at DC and 4000 Hz generate infinite noise enhancements when LE is employed. To reduce such noise enhancements, more advanced equalization techniques should be used. Those are decision feedback equalizers (DFE) and partial response equalizers (PRE). Although usually treated separately, LE and PRE are just special cases of DFE. DFE includes two portions: the forward equalizer (FE) and the feedback equalizer (FBE). Both the FE and the FBE can be implemented as linear FIR filters, where the input samples serve as an input to the FE and the previously decoded symbols serve as input to the FBE. The output of both the FE and the FBE are added together and the result is used as the basis for decision for determining the transmitted signal. DFE allows some ISI to remain at the output of FE to be then canceled by FBE. It has been shown that DFE can be the optimum receiver with no decision delay. When, used in conjunction with Viterbi detector, (VD) DFE becomes a powerful tool in battling ISI even for channels with spectral nulls.

However the implementation of a Viterbi detector grows considerably more complex with number of levels used by the transmission symbols and by number of taps in the FBE. The computational complexity of a Viterbi detector is proportional to $L^M$ where M is the number of FBE taps and L is the size of the transmitted symbols alphabet.

Partial response equalizers (PRE), being a special case of DFE are used to reduce the computational complexity of the Viterbi detector by forcing the FE to leave uncanceled only a controlled amount of ISI, thus requiring only a small number of FBE taps to cancel it. The combination of channel impulse response and FE of PRE form a response, called Partial Response (PR), which contains only a few, usually integer-valued coefficients, thus allowing controlled levels of ISI from a small number of symbols to be present at the instances of decision making. A Viterbi detector is then employed to remove that ISI and make the most probable decision. The choice of partial response depends heavily on the transmission channel. When spectral characteristics of the partial response match those of a channel, the FE has an easier task and noise enhancement is limited. For a channel with spectral nulls, it is highly desirable to use a partial response having spectral nulls at the same positions to avoid infinite noise enhancement. A pulse code modulation (PCM) channel has two spectral nulls: one around DC, another around 4000 Hz, thus confining the choice of the partial response for PCM modem to those with the same spectral nulls. Class IV Partial Response (PRIV) often called modified duobinary, has long been used for the channels with similar characteristics and is well known in the art.

The PRIV FE output contains the difference of two symbols spaced by two symbol intervals:

$$y_n = x_n - x_{n-2}$$

Since ISI from only one symbol is present, the number of states of the Viterbi detector equals L—the size of the symbol alphabet. For data rates achievable by a V.90 compliant modem, L<=128. Although implementation of 128-state Viterbi decoder is not trivial, Set Partitioning, a well known technique in the art, can be used to reduce the number of Viterbi detector states to a more manageable number. However, when the channel has severe attenuation at a wider range of frequencies adjacent to DC and 4000 Hz, the noise enhancement by a class IV partial response equalizer becomes intolerable.

Therefore, it would be desirable to utilize a partial response equalizer that does not exhibit intolerable noise enhancement and to have the performance of a Viterbi decoder with manageable complexity.

SUMMARY OF THE INVENTION

Accordingly the invention provides a reduced state maximum likelihood sequence estimator that causes only a slight degradation of performance relative to an implementation of a full state Viterbi decoder. That allows the use of improved equalization techniques that greatly improve performance for channels with severe attenuation and spectral nulls.

In one embodiment of the invention, a method is provided for implementing a reduced state maximum likelihood sequence estimator in a communications system to decode a received signal. The method includes retaining $k_n$ states of a total number of K states, $k_n<K$, each retained state having an associated state metric. $(J)(k_n)$ new states are determined based on $k_n$ previous states and a most recently received symbol, using J transitions, J being a less than L, where L is a size of a symbol alphabet. $(J)(k_n)$ new state metrics are determined which are respectively associated with each new state. The new state metrics are compared to a threshold and those states whose metric does not exceed the threshold are retained.

In another embodiment, the invention provides a modem that includes a partial response class V (PRV) equalizer coupled in its receive path. In still another embodiment of the invention a modem includes a reduced state maximum likelihood sequence estimator (MLSE) in its receive path. That MLSE may be coupled to a partial response equalizer. The reduced state maximum likelihood sequence estimator retains a varying number of reduced states. The number of retained states may be limited by use of an adaptive threshold that limits the number of retained states between a lower bound and an upper bound. The threshold may be determined according to a metric of a most likely state of the retained states and a selected one of a plurality of associated transition metrics.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

DESCRIPTION OF THE PREFERRED EMBODIMENT(S)

The current invention provides an approach which addresses the issue of computational complexity of the Viterbi algorithm by offering an efficient approach which, while being suboptimal, causes only a slight degradation of performance relative to an implementation of a full state Viterbi decoder. That allows the use of improved equalization techniques.

As discussed above, when the channel has severe attenuation at a wider range of frequencies adjacent to DC and 4000 Hz, the noise enhancement caused by the use of a PRIV equalizer becomes intolerable. One approach to battle this noise enhancement is to use Partial Response class V (PRV) equalizer. PRV FE output contains the second difference of symbols spaced by two symbol intervals, and can be expressed as:

$$y_n = x_n - 2x_{n-2} + x_{n-4}$$

The PRV equalizer has double nulls at DC and 4000 Hz and thus produces much less noise enhancement for channels with high attenuation at band edges. PRV equalizers were never considered practical for multilevel signals such as those received in modems conforming to the V.90 standard, because of the huge number of states required by Viterbi decoding. For example, a straightforward Viterbi implementation for a data rate of 56Kbits/sec having 128 symbols, requires 16,384 states. Such an implementation requires a significant amount of memory to store the states as well as having high computational complexity because of the large number of states. Computational complexity of such Viterbi decoding is enormous even when set partitioning is employed. Plain decision driven FBE cannot be used because of stability considerations. Even a single decision error will cause a subsequent chain reaction without any chance for recovery. The efficient reduced state MLSE disclosed herein allows the use a wide variety of partial response equalizers with performance close to that achieved by a full state Viterbi decoder without the enormous computational load required by a full state Viterbi decoder.

Another aspect of equalizer implementation is the tap spacing. T-spaced equalizers use the signal sampled at the symbol rate. Fractionally spaced equalizers (FSE) operate on a signal sampled at a rate higher than the symbol rate and require eventual down sampling. It is known that T-spaced equalizers depend heavily on coded sample clock phase, and that there is at least one value of the phase in the symbol interval T for which the combined channel response and equalizer response have spectral nulls at half symbol rate. To avoid this undesirable effect, modem designers traditionally employed FSE in spite of its higher computational complexity. However since PRV equalizers actually require spectral null at half symbol rate, the advantage of FSE becomes non-existent. Therefore a T-spaced equalizer is a logical choice for a V.90, modem. Use of T-spaced equalizer also allows the use of 8 KHz sample rate for the A/D converter.

Figure 2:
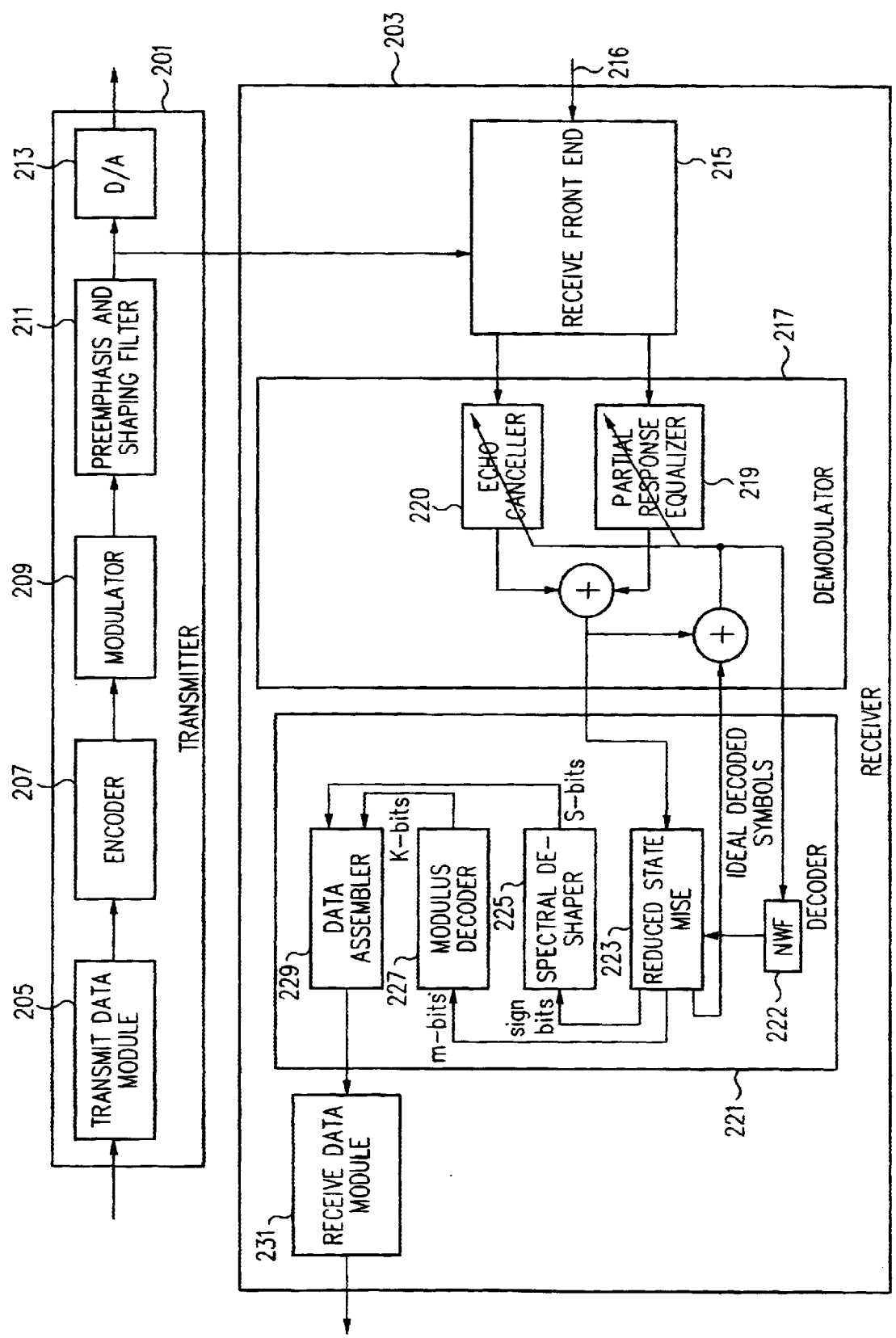
FIG. 2 illustrates an exemplary modem incorporating an embodiment of the present invention.

A block diagram of an exemplary V.90 modem employing an embodiment of a reduced state maximum likelihood sequence estimator and a class V partial response equalizer according to the present invention is shown in FIG. 2. A brief description of the modem shown in FIG. 2 will provide the appropriate context for better understanding the embodiments of the invention described herein. A detailed discussion of the operation of the exemplary modem is not provided as modem operation in conformance with, e.g., the V.90 recommendation, is known the art. In one embodiment, the MLSE and partial response equalizer shown in FIG. 2 are implemented in software which may be stored on computer readable media which can be executed on a general purpose processor. Those of skill in the art will appreciate that the teachings herein may also be applied to a variety of modem implementations such as those using a digital signal processors and/or stand alone processors.

The block diagram of the modem shown in FIG. 2 includes transmitter 201 and receiver 203. The transmitter data module 205 supplies bits to the encoder 207. The transmitter module 205 either generates those bits locally in the case of training or fetches them from the external data source in the case of data mode. It then scrambles the bits as required and passes the data to the encoder 207. Encoder 207 converts the input bit stream from data module 205 into a sequence of symbols which are then provided to modulator 209. Modulator 209 performs appropriate sampling and filtering operations and provides its output to shaping and preemphasis filter 211 that provides square-root-of raised cosine shaping as well as preemphasis filtering specified by the V.90 recommendation. That output is provided to the digital to analog converter 213.

The receiver portion of the modem 203 receives the output from the transmitter (prior to the D/A) into receiver front end 215. Receiver front end also receives the signal 216 from the channel. The front end 215 performs such operations as analog to digital conversion on the received signal, various filtering and echo-canceling operations and provides its output to the demodulator 217. The demodulator 217 includes partial response class V equalizer 219 as described further herein. The demodulator 217 also includes the second stage near end echo canceller 220, which cancels the echo at the output of the equalizer and is intended to track slow variations of the echo signal. The output of the partial response equalizer is provided to the decoder 221 and more specifically to the reduced state maximum likelihood sequence estimator 223, as described further herein.

Note that the noise signal at the output of PRV equalizer is strongly colored due to the nature of the partial response used. A noise-whitening filter 222 is required to achieve optimal performance of the MLSE. The noise-whitening filter is designed as an error predictor. It is trained during the reception of TRN signal during training phase and then used in conjunction with the MLSE to minimize the error probability.

The symbols decoded by MLSE 223 are then split into sign and amplitude components and passed respectively to the spectral de-shaper 225 and modulus decoder 227. Both of those modules extract the data payload from the symbols that is later converted to a bit stream by data assembler 229. Receive data module 231 descrambles this bit stream and passes it to the application program.

While a V.90 modem has been described, it should be understood that other modems and other communication devices may advantageously use the invention described herein.

Referring still to the block diagram shown in FIG. 2, the partial response equalizer 219 provides its output, ($y_n = x_n - 2x_{n-2} + x_{n-4}$), to the reduced state MLSE 223. Because it is a reduced state estimator, at any given time, nT, the reduced state MLSE described herein retains only a reduced number of states $k_n$. Note that $k_n$ can vary, having a lower bound and an upper bound such that $k_1 <= k_n <= k_2$. A further simplification as compared to the full state Viterbi detector is that only a reduced number of transitions, J, are analyzed, J<L, L being the size of the alphabet.

The advantages of the reduced state approach described herein are readily apparent when compared with a full state Viterbi decoder implementation. For example, for a full Viterbi decoder, 16,384 states can be required for a modem conforming to the V.90 recommendation (alphabet of 128). In comparison, in one embodiment of the invention described herein, the reduced number of states may be only 12. Further, only two transitions (J=2) from those retained states are analyzed rather than L transitions (L being the size of the alphabet, e.g. 128). The parameters $k_1$ and $k_2$ are parameters of the reduced state MLSE which can be selected to adaptively control tradeoff between performance and computational complexity. In addition J can also be adjusted to increase and/or reduce the complexity.

Figures 1, 3:
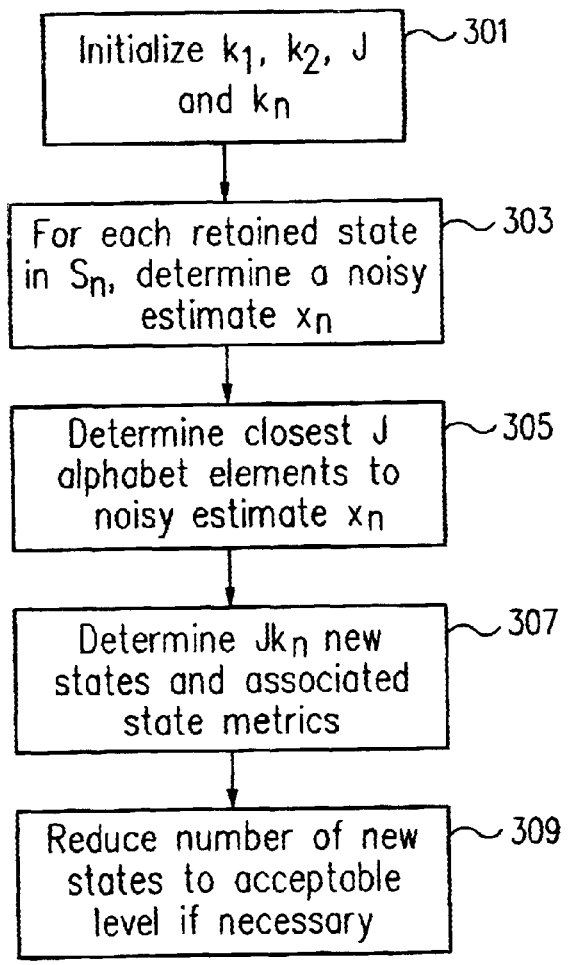
FIG. 1 illustrates the state vector and state metric utilized in Viterbi decoding.
FIG. 3 is a flow chart illustrating how reduced states and reduced transitions are utilized in an embodiment of the present invention.

Referring to FIG. 3, the flowchart illustrates generally an embodiment of the reduced state estimator. The parameters $k_1$, $k_2$, $k_n$ and J are initialized. Some or all of the parameters may be implemented as programmable or may be fixed. Exemplary values are: $k_1$=8, $k_2$=16, $k_n$=12 and J=2. In 303, a noisy estimate of the received signal is determined for each of the retained states. Next, the MLSE determines the closest J alphabet elements to the noisy estimate in 305. In 307, the MLSE, using the J alphabet elements, determines the $(J)(k_n)$ new states. Thus, if there are 12 states in $k_n$, and J=2, then 24 new states will be generated. The transition metric associated with each alphabet element is added to the state metric for each of the retained states to determine a state metric associated with each of the new states. Finally, if the number of new states is outside the range of $k_1$ and $k_2$, then the number of new states are adjusted accordingly.

If the number of new states is greater than $k_2$, the new states must be reduced down to the desired number of retained states. Otherwise, the number of retained states will grow, quickly causing the computational complexity to be burdensome. Therefore, if $(J)(k_n)$ (the number of new states) >$k_2$, the MLSE discards those states with the largest metrics such that $k_1$<=the number of the remaining states<=$k_2$. In that way, the number of retained states is manageable.

One approach to select the appropriate ones of the new states to retain is to sort the temporary state metrics in ascending order, and then select the first $k_n$ new states to become the retained states. However sorting is an expensive operation with complexity of the order $(k_n^2)$. If $k_1$ and $k_2$ are large, sorting may become the dominant operation of the overall algorithm. An alternative to sorting is to determine an empirically based threshold "t." The metrics of the new states are compared to the threshold. Those new states whose metric is below the threshold are retained. One way to calculate the threshold "t" is as follows:

$$t=((k_1+k_2)/(2Jk_n))\ (1/Jk_n)\Sigma d_{jn+1}$$

That formula is designed to provide a threshold that is adaptive according to the number of retained states. Assume that $k_1$=8, $k_2$=16, J=2 and the target $k_n$ is 12. If the number of new states $(J)(k_n)$ is exactly twice the target of 12, i.e. the number of retained states is exactly the target, then the first term of the equation above provides (½). That term is used to adjust the average metric of the new states determined by $(1/Jk_n)\Sigma d_{jn+1}$. If the number of retained states is exactly the target of 12, then (½) of the average metric is selected as the target. Note that the average is used to provide an estimate of the median. If the number of retained states is less than the target $k_n$, the next threshold adjusts to be somewhat higher than ½ of the average metric. Alternatively, if the number of retained states is greater than the target, then the next threshold adjusts to be below (½) of the average metric. In that way, the threshold continually adapts to the actual number of retained states and fluctuates around the target $K_n$.

A new threshold is typically determined for every new received symbol. All states are selected as retained states whose metric is less than threshold (t). This threshold approach has a complexity of the order $(k_n)$ and is much more efficient for large $k_1$, $k_2$. It however does not guarantee that the resulting number of states selected from the new states are in the range $[k_1:k_2]$.

In case the number of states selected from the new states are not in the range of $[k_1:k_2]$, the threshold has to be adjusted and selection repeated. If the threshold needs adjusting, it can be adjusted up or down, as needed by a fixed percentage, e.g., 25% or some other percentage appropriate to the particular implementation. Thus, if there are too few retained states, (<$k_1$), (t) can be adjusted up 25% and similarly, if there are too many retained states (>$k_2$), (t) can be adjusted down. The wider the range $[k_1:k_2]$ the smaller the chance that repeat selection would be required. In simulation results for the cases where $k_2$=2$k_1$ repeat selection of the threshold is only required in about 10% of iterations.

Figure 4:
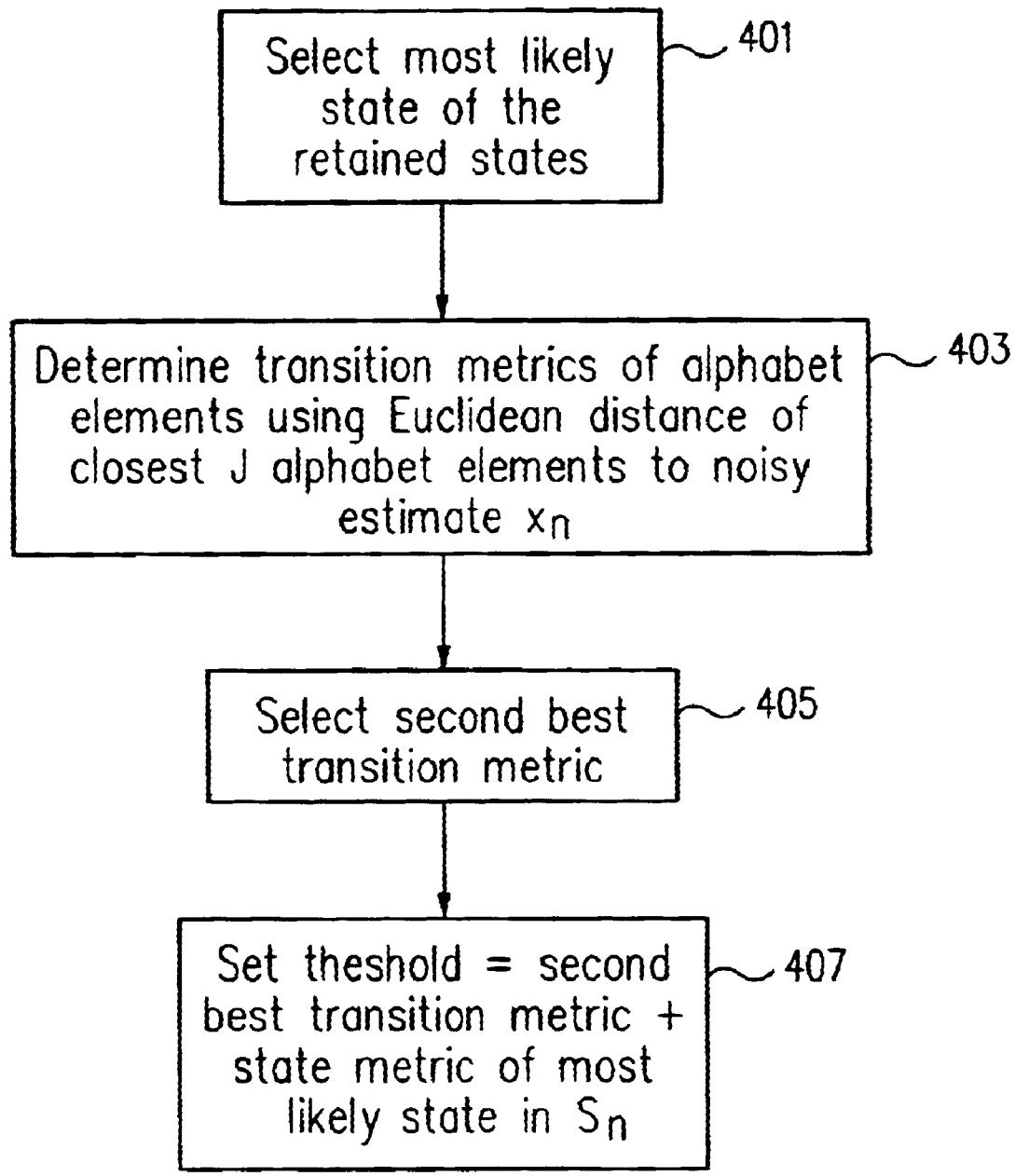
FIG. 4 is a flow chart illustrating the method of determining the threshold according to one embodiment of the invention.

Other empirical approaches for determining the threshold t are also possible. For example, another approach is illustrated in FIG. 4. Most of the operations illustrated in FIG. 4 are performed as part of the reduced state approach described herein and do not have to be repeated for determination of the threshold. In 401, the most likely state of the retained states is selected according to its state metric. That is, of the retained states, the most likely state is that having the lowest metric, which is the output of the MLSE. Then, using the noisy estimate $x_n$ of the received signal $z_n$, the elements of the alphabet closest to $x_n$ are selected and their transition metrics determined. Those elements will have metrics associated with them based on the Euclidean distance from the noisy estimate $x_n$. In 407, the transition metric is selected. For the case of J=2, the transition metric selected is the second best transition metric. That provides a threshold for the next estimate. Then in 407, the threshold is determined as the sum of the previous best state metric and one of the transition metrics. The second best metric is chosen to provide a threshold that is high enough to generate a sufficient number of retained states. If the threshold is set too low or too higher, such that fewer than $k_1$ or greater than $k_2$ states would be retained, the threshold may be adjusted up or down accordingly. Note that if J is other than two, a metric other than second best may be chosen. This approach provides an adaptive threshold based on one of the retained states (the best retained state in the embodiment described).

The reduced state MLSE described herein may be used advantageously with a partial response class V equalizer, as illustrated, e.g., in FIG. 2 to provide improved performance over channels with severe attenuation and spectral nulls. The combination of the MLSE and a PRV equalizer is described as follows.

For each of $k_n$ retained values, $S_{jn}$, j=1, 2, . . . $k_n$, of state vector $S_n$, and received noisy signal $z_n$, the MLSE calculates a noisy estimate of sent signal $x_{jn}$:

$$x_{jn} = z_n - \sum_{i=1}^{M-1} x_{n-i} h_i$$

In the equation above, M is the memory of the channel in symbol intervals and $z_n$ is the noisy output of the equalizer. For use with the PRV equalizer, in order to determine an estimate of the sent signal, the MLSE has to subtract out the second difference of symbols spaced by two symbol intervals as previously described $(-2x_{n-2}+x_{n-4})$. Therefore in the equation above, h=−2 for i=2 and h=1 for i=4. Because M=5, four history terms have to be stored for each retained state. Only two of the history terms are used during any particular generation of the noisy estimate. A noisy estimate is generated for each of the retained states using the stored history values and the output of the PRV.

The next operation of the MLSE is to determine J elements from alphabet A for each estimate $x_{jn}$, such that the Euclidean distance from these elements to $x_{jn}$ is the smallest. Assuming J is two, the two alphabet elements closest to each noisy estimate, $x_{jn}$ are selected. If the noisy estimate is below the lowest alphabet element or above the largest element, the first or last two alphabet element are chosen, respectively.

Finally, the MLSE calculates $(J)(k_n)$ temporary new states for state vector $S_{n+1}$, and state metric $D_{n+1}$, having a metric associated with each of the states in state vector $S_{n-1}$.

Thus, continuing with the assumption that $k_n=8$ and J=2, 16 new states will be calculated. In addition, 16 state metrics are determined that are associated with the new states. The new state metrics are based on the prior state metric and the transition metric associated with the J transitions selected. The transition metrics, as is known in the art, are determined according to the Euclidean distance between the J alphabet points and the noisy estimate.

Each new state is generated using the elements (alphabet values) from the previous state, by deleting the oldest element and inserting as the newest element, the alphabet element representing the received value that transitioned the previous state in $S_n$ to the current state in $S_{n-1}$.

As described previously, various threshold techniques may be employed to reduce the new states to the appropriate number. If necessary, the threshold may be increased or decreased to increase or reduce, respectively, the number of retained states. As with the rest of the MLSE and the PRV equalizer described herein, the operation of determining and adjusting the threshold may be implemented in software instructions operating on a digital signal processor and/or a general purpose processor.

The description of the invention set forth herein is illustrative, and is not intended to limit the scope of the invention as set forth in the following claims. For instance while the reduced state MLSE described herein was described in association with a partial response class V equalizer, the reduced state MLSE described herein may be employed wherever Viterbi decoding has been used, for example in decoding convolutionally encoded data or in conjunction with different classes of partial response equalizers. Additionally, while the communication device described was a modem complying with the V.90 standard, other telecommunication devices may also benefit from the invention described herein and the invention should not be considered as being limited to a particular type of communication device or to a particular modem implementation. Variations and modifications of the embodiments disclosed herein, may be made based on the description set forth herein, without departing from the scope and spirit of the invention as set forth in the following claims.

What is claimed is:

1. A method of implementing a reduced state maximum likelihood sequence estimator in a communications system to decode a signal, comprising:

retaining $k_n$ states of a total number of K states, $k_n<K$, each retained state having an associated state metric;

determining $(J)(k_n)$ new states based on $k_n$ previous states and a most recently received sample, using J transitions, J being a less than L, where L is a size of a symbol alphabet;

determining $(J)(k_n)$ new state metrics respectively associated with each new state;

performing a comparison of the new state metrics to a threshold; and retaining those new states whose metric does not exceed the threshold.

2. The method as recited in claim 1 wherein the threshold is adaptively determined.

3. The method as recited in claim 1 wherein the number of retained states $k_n$, varies between a lower bound and an upper bound.

4. The method as recited in claim 1 wherein the threshold is fixed.

5. The method as recited in claim 2 wherein the threshold is determined according to an average of the metrics of the new states and the number of retained states $k_n$.

6. The method as recited in claim 5 wherein the threshold (t) is determined according to $t=((k_1+k_2)/(2Jk_n))(1/Jk_n)\Sigma d_{jn+1}$, where $\Sigma d_{jn+1}$ is the sum of the metrics of the new states and wherein $k_1+k_2$ are the lower and higher bound, respectively, of $k_n$.

7. The method as recited in claim 2 wherein determining the threshold comprises:

determining a most likely one of the retained states according to its associated metric;

determine the J transitions from the most likely retained state and associated J transition metrics;

determining the threshold to be the metric associated with the most likely retained state added to a selected transition metric associated with one of the J transitions.

8. The method as recited in claim 7 wherein the selected transition metric is not the lowest of the J transition metrics.

9. The method as recited in claim 7 wherein the selected transition metric is second lowest of the J transitions.

10. A modem comprising an equalizer having a partial response class V (PRV), the equalizer coupled in a receive path of the modem.

11. The modem as recited in claim 10 wherein an alphabet size of possible values of a transmitted symbol is large, so as to make computational complexity of full state Viterbi decoding unmanageable.

12. The modem as recited in claim 11 wherein the alphabet size >32.

13. The modem as recited in claim 10 further comprising a reduced state maximum likelihood sequence estimator (MLSE) coupled to the PRV equalizer.

14. A modem comprising:

a partial response class V (PRV) equalizer coupled in a receive path of the modem;

a reduced state maximum likelihood sequence estimator (MLSE) coupled to the PRV equalizer; and wherein the MLSE further comprises:

a plurality $k_n$ of retained states, each of the retained states having an associated state metric, $k_n$ being less than a total number of possible states;

a set of $(J)(k_n)$ new states, determined according to J transitions, J being a less than a size of a symbol alphabet, and an associated set of new state metrics; and a threshold for comparison to the new state metrics.

15. The modem as recited in claim 14 wherein the threshold is adaptive.

16. The modem as recited in claim 14 wherein $k_n$ is variable.

17. The modem as recited in claim 14 wherein the MLSE, receiving the output $z_n$, of the PRV equalizer, calculates a noisy estimate of a sent symbol, for each of the retained states.

18. The modem as recited in claim 17 wherein the noisy estimate $x_{jn}$ of the sent signal is determined according to:

$$x_{jn} = z_n - \sum_{i=1}^{M-1} x_{n-i} h_i$$

wherein M−1 is the number of stored history terms and h=−2 for i=2 and h=1 for i=4.

19. A modem comprising a reduced state maximum likelihood sequence estimator (MLSE) in a receive path of the modem, wherein the reduced state maximum likelihood sequence estimator further includes an adaptive threshold for comparison to potential new state metrics, for limiting a number of retained states, wherein the adaptive threshold is adaptive according to a previous number of previously retained states.

20. The modem as recited in claim 19 further comprising a partial response equalizer operatively coupled to provide a partial response to the reduced state maximum likelihood sequence estimator.

21. The modem as recited in claim 20 wherein the partial response equalizer is a T-spaced equalizer.

22. The modem as recited in claim 19 wherein the reduced state maximum likelihood sequence estimator retains a varying number of reduced states.

23. A modem comprising a reduced state maximum likelihood sequence estimator (MLSE) in a receive path of the modem wherein the reduced state maximum likelihood sequence estimator further maintains storage encoding:
    a plurality $k_n$ of retained states, each of the retained states having an associated state metric, $k_n$ being less than a total number of possible states;
    a set of (J)($k_n$) new states, determined according to J transitions, J being a less than a size of a symbol alphabet, and an associated set of new state metrics; and
    a threshold for comparison to the new state metrics.

24. A method of operating a modem comprising generating a partial response using an equalizer on a received signal, the equalizer having a partial response class V (PRV).

25. The method as recited in claim 24 further comprising providing the output of the PRV equalizer to a reduced state maximum likelihood sequence estimator.

26. The method as recited in claim 25 further comprising generating an estimate of the transmitted symbol using a variable number of reduced states and the received signal.

27. A method of operating a modem comprising:
    generating a partial response using an equalizer on a received signal, the equalizer having a partial response class V (PRV);
    providing the output of the PRV equalizer to a reduced state maximum likelihood sequence estimator; and
    generating an estimate of the transmitted symbol using a variable number of reduced states and the received signal, wherein the variable number of the reduced states is determined as a function of a metric of one of the reduced states and an associated transition metric.

28. A method of operating a modem comprising:
    generating a partial response using an equalizer on a received signal, the equalizer having a partial response class V (PRV);
    providing the output of the PRV equalizer to a reduced state maximum likelihood sequence estimator; and
    generating an estimate of the transmitted symbol using a variable number of reduced states and the received signal, wherein the variable number of reduced states is determined according to an adaptively determined threshold.

29. A method of operating a modem comprising:
    providing a most likely estimate of a transmitted symbol using a reduced state maximum likelihood sequence estimator;
    generating an estimate of the transmitted symbol using a variable number of reduced states in the maximum likelihood sequence estimator; and
    determining the variable number of reduced states according to an empirically determined metric threshold, wherein the empirically determined metric threshold is empirically determined according to a previous number of previously retained states.

30. The method as recited in claim 29 further comprising providing a partial response from a partial response equalizer to the reduced state maximum likelihood sequence estimator.

31. The method as recited in claim 29, wherein the threshold is determined according to a metric of a most likely state and a selected one of a plurality of associated transition metrics.

32. The method as recited in 30 wherein the partial response equalizer is a class V partial response equalizer.

33. A method of implementing a reduced state maximum likelihood sequence detector comprising:
    retaining a varying number of states, the number of retained states being determined according to an adaptive threshold; and
    determining the number of retained states by comparing the metrics of potential retained states to the adaptive threshold,
    wherein the adaptive threshold is adaptive according to the previous number of previously retained states.

34. The method as recited in claim 33 wherein the number of retained states $k_n$ varies between upper and lower bounds, $k_1 \leq k_n \leq k_2$.

35. The method as recited in claim 33 wherein the threshold is adjusted if the number of retained states is less than $k_1$ and if the number of retained states is greater than $k_2$.

36. A method of decoding a received signal, comprising:
    retaining a first plurality of retained states, the first plurality being less than a number of possible states;
    dynamically determining a threshold for comparison with state metrics;
    determining a second plurality of new states and associated state metrics; and
    keeping as new retained states those new states having a metric less than the dynamically determined threshold.

37. A computer program product implementing a reduced state maximum likelihood sequence estimator for a received signal encoded in a machine readable medium and executable on a computer to:
    retain $k_n$ states of a total number of K states, $k_n$<K, each retained state having an associated state metric;
    determine (J)($k_n$) new states based on $k_n$ previous states and a most recently received sample, using J transitions, J being a less than L, where L is a size of a symbol alphabet;
    determine (J)($k_n$) new state metrics associated respectively with each new state;
    perform a comparison of the new state metrics to a threshold; and keep as new retained states those states whose metric does not exceed the threshold.

38. The computer program product as recited in claim 37 encoded by or transmitted in at least one computer readable medium selected from the set of a disk, tape, or other magnetic, optical or electronic storage medium and a network, wireline, wireless or other communications medium.

39. A communication device comprising:
a reduced state maximum likelihood sequence estimator coupled into a received path of the communication device;
retained state storage; and
means for selecting new states to be retained in the retained state storage based on a dynamically calculated state metric threshold, wherein the dynamically calculated state metric threshold is dynamically calculated according to a previous number of previously retained states.

40. The method as recited in claim 36 wherein the threshold is determined for every new received symbol.

* * * * *

UNITED STATES PATENT AND TRADEMARK OFFICE
CERTIFICATE OF CORRECTION

PATENT NO. : 6,618,451 B1
DATED : September 9, 2003
INVENTOR(S) : Mark Gonikberg It is certified that error appears in the above-identified patent and that said Letters Patent is hereby corrected as shown below:

Column 1,
Line 44, "$i\in]-;[,$" should read -- $i\in]-\infty;\infty[,$ --
Line 47, "h$_i$story" should read -- history --

Column 2,
Line 2, "h$_i$story" should read -- history --
Line 65, "These" should read -- Those --

Column 8,
Line 67, "$(-2x_{n-2} + x_{n-4}))$" should read -- $(-2x_{n-2} + x_{n-4})$ --

Column 10,
Lines 41-42, "wherein the alphabet size > 32." should read
-- wherein the alphabet size $\geq$ 32. --

Signed and Sealed this

Third Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,618,451 B1
DATED : September 9, 2003
INVENTOR(S) : Mark Gonikberg It is certified that error appears in the above-identified patent and that said Letters Patent is hereby corrected as shown below:

<u>Title page,</u>
Item [73], please add the following:
-- Assignee: AltoCom, Inc. Irvine, CA --

Signed and Sealed this

Second Day of March, 2004

JON W. DUDAS
*Acting Director of the United States Patent and Trademark Office*